(12) United States Patent
Dimitrov et al.

(10) Patent No.: US 8,970,991 B2
(45) Date of Patent: Mar. 3, 2015

(54) COUPLING FEATURE IN A MAGNETORESISTIVE TRILAYER LAMINATION

(71) Applicant: Seagate Technology LLC, Cupertino, CA (US)

(72) Inventors: Dimitar Velikov Dimitrov, Edina, MN (US); Dian Song, Eden Prairie, MN (US); Wonjoon Jung, Eden Prairie, MN (US); Mark William Covington, Edina, MN (US); Mark Thomas Kief, Lakeville, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/797,260

(22) Filed: Mar. 12, 2013

(65) Prior Publication Data

US 2014/0268428 A1 Sep. 18, 2014

(51) Int. Cl.
*G11B 5/39* (2006.01)

(52) U.S. Cl.
CPC ............ *G11B 5/3912* (2013.01); *G11B 5/3932* (2013.01)
USPC ....................... 360/313; 360/324.12; 360/319

(58) Field of Classification Search
USPC ............ 360/313, 319, 324.1, 324.11, 324.12, 360/324.2, 324
See application file for complete search history.

(56) References Cited

U.S. PATENT DOCUMENTS

| 6,876,524 | B2 | | 4/2005 | Tagawa et al. | |
| 7,035,062 | B1 | | 4/2006 | Mao et al. | |
| 7,706,108 | B2 | | 4/2010 | Gill | |
| 7,848,061 | B2 | * | 12/2010 | Jayasekara et al. | 360/319 |
| 7,869,165 | B2 | * | 1/2011 | Miyauchi et al. | 360/319 |
| 7,939,188 | B2 | * | 5/2011 | Xi et al. | 428/811.1 |
| 7,974,048 | B2 | | 7/2011 | Shimazawa et al. | |
| 8,659,854 | B2 | * | 2/2014 | Singleton et al. | 360/319 |
| 2008/0253037 | A1 | * | 10/2008 | Kagami et al. | 360/324 |
| 2009/0021870 | A1 | * | 1/2009 | Pinarbasi | 360/324.11 |
| 2010/0003973 | A1 | | 1/2010 | Kashiwase et al. | |
| 2010/0067148 | A1 | | 3/2010 | Tsuchiya et al. | |
| 2011/0007427 | A1 | * | 1/2011 | Qiu et al. | 360/319 |
| 2011/0310513 | A1 | * | 12/2011 | Dimitrov et al. | 360/319 |
| 2012/0147504 | A1 | * | 6/2012 | Zhou et al. | 360/324.12 |
| 2012/0281320 | A1 | * | 11/2012 | Singleton et al. | 360/319 |

* cited by examiner

*Primary Examiner* — Jefferson Evans
(74) *Attorney, Agent, or Firm* — Hall Estill Attorneys at Law

(57) ABSTRACT

A data storage device may be generally directed to a data transducing head capable of magnetoresistive data reading. Such a data transducing head may be configured with at least a trilayer reader that contacts and is biased by a coupling feature. The coupling feature may have a smaller extent from an air bearing surface (ABS) than the trilayer reader.

19 Claims, 5 Drawing Sheets

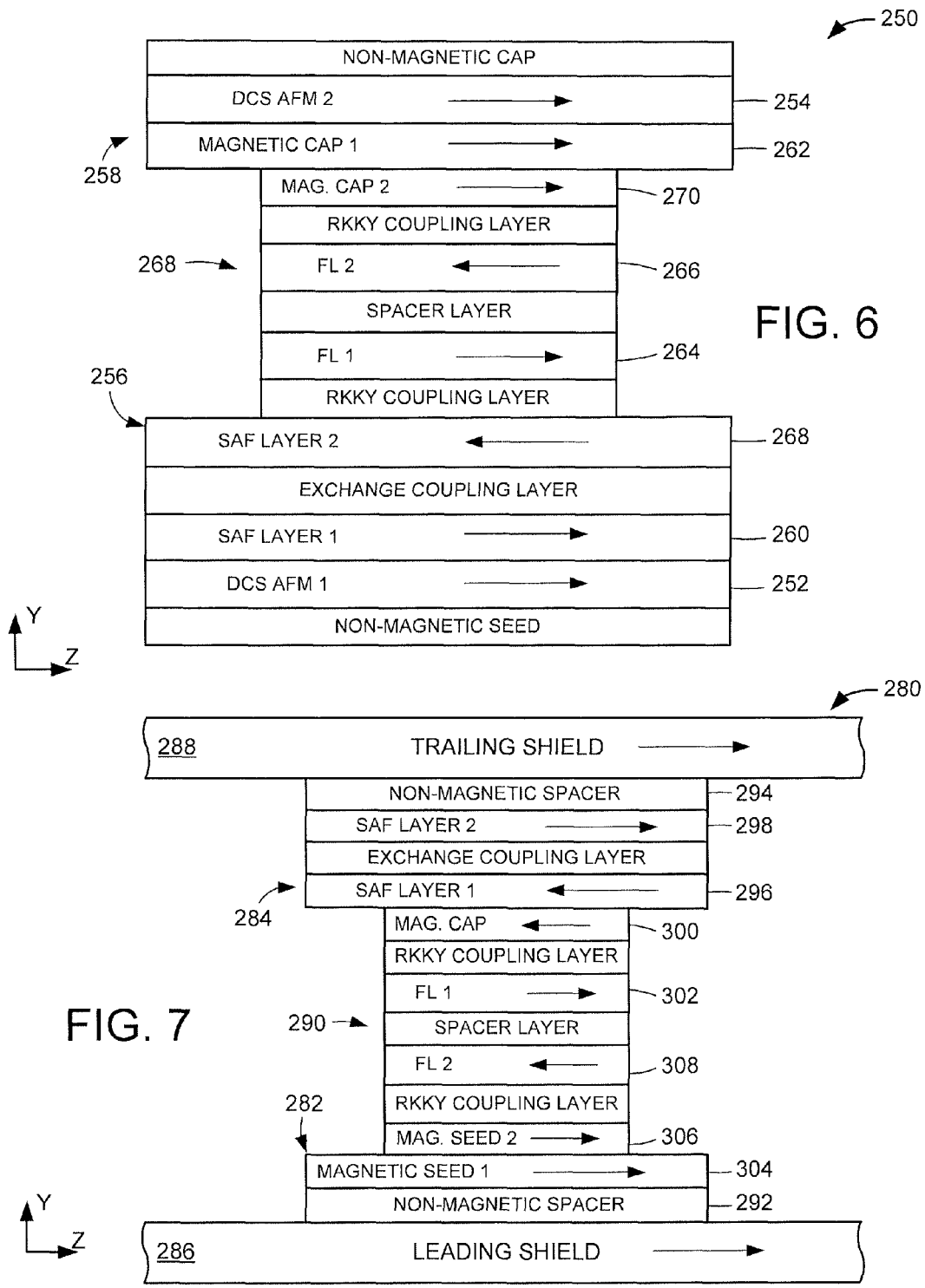

COUPLING FEATURE IN A MAGNETORESISTIVE TRILAYER LAMINATION

SUMMARY

Various embodiments can generally be directed to a data storage device capable of sensing data across an air bearing.

In accordance with various embodiments, a trilayer reader can contact and be biased by a coupling feature that has a smaller extent from an air bearing surface (ABS) than the trilayer reader.

BRIEF DESCRIPTION OF THE DRAWINGS

FIG. 6 provides a block representation of a portion of an example data reader constructed in accordance with some embodiments.

FIG. 7 presents a block representation of a portion of an example data reader configured in accordance with various embodiments.

DETAILED DESCRIPTION

The advancement of data storage devices, especially rotating data environments, has involved the miniaturization of data accessing components along with increased data access and processing speeds to provide higher linear data density. The reduction in the physical size of data reading components can stress the magnetic sensitivity tolerances of modern deposition and manufacturing processes. An increased magnetic sensitivity can translate to large magnetic yield loss and degraded data storage reliability and performance that are not conducive to high linear data density data storage environments.

The use of a magnetic data stack characterized as a trilayer reader due to the presence of two magnetically free layers separated by a non-magnetic spacer layer can have an increased stripe height and shaped magnetic shields to combat increased magnetic sensitivity. However, scaling such designs to microscopic magnitudes, such as below 15 nm shield-to-shield spacing, can pose difficult magnetization retention and operation that may be prone to increased magnetic noise and reduced data reading performance.

Accordingly, various embodiments are generally directed to a trilayer reader that contacts and is biased by a coupling feature that has a smaller extent from an air bearing surface (ABS) than the trilayer reader. The addition of a coupling feature at the ABS can complement a rear bias magnet to more uniformly bias the trilayer reader to predictably respond to encountered magnetic data bits. The uniform bias further allows the magnetically sensitive portions of the trilayer reader to be thinner and less susceptible to magnetic noise, which optimizes magnetic resolution for high linear data bit density data storage devices.

Figure 1:
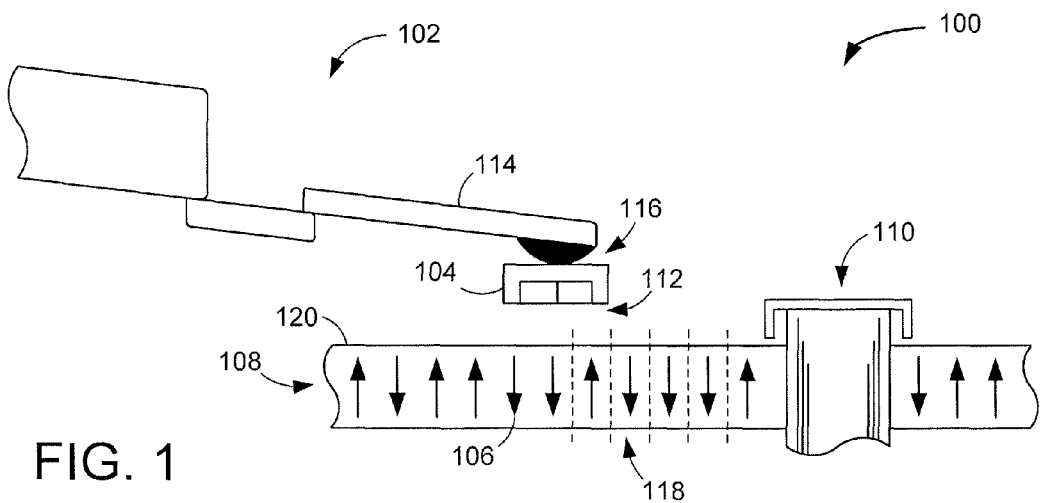
FIG. 1 generally provides of a block representation of an example data storage environment.

While a trilayer reader may be used in a variety of different data storage environments, FIG. 1 generally provides a data transducing portion 100 of an example data storage device in accordance with various embodiments. While not required or limiting, the data transducing portion 100 is configured with an actuating assembly 102 that positions a transducing head 104 over programmed data bits 106 present on a magnetic storage media 108 that is attached to, and rotates about, a spindle motor 110 to produce an air bearing surface (ABS) 112. The speed in which the spindle motor 110 rotates allows a slider portion 114 of the actuating assembly 102 to fly on the ABS 112 to position a head gimbal assembly (HGA) 116, which includes the transducing head 104, over a desired portion of the media 108.

The transducing head 104 may be constructed with one or more transducing elements, such as a magnetic writer and magnetically responsive reader, which operate to program data to and read data bits 106 from the storage media 108, respectively. In this way, controlled motion of the actuating assembly 102 and spindle motor 110 can modulate the position of the transducing head 104 both laterally along predetermined data tracks 118 defined on the storage media surface 120 and vertically as measured perpendicularly to the media surface 120 across the ABS 112 to selectively write, read, and rewrite data.

Figure 2:
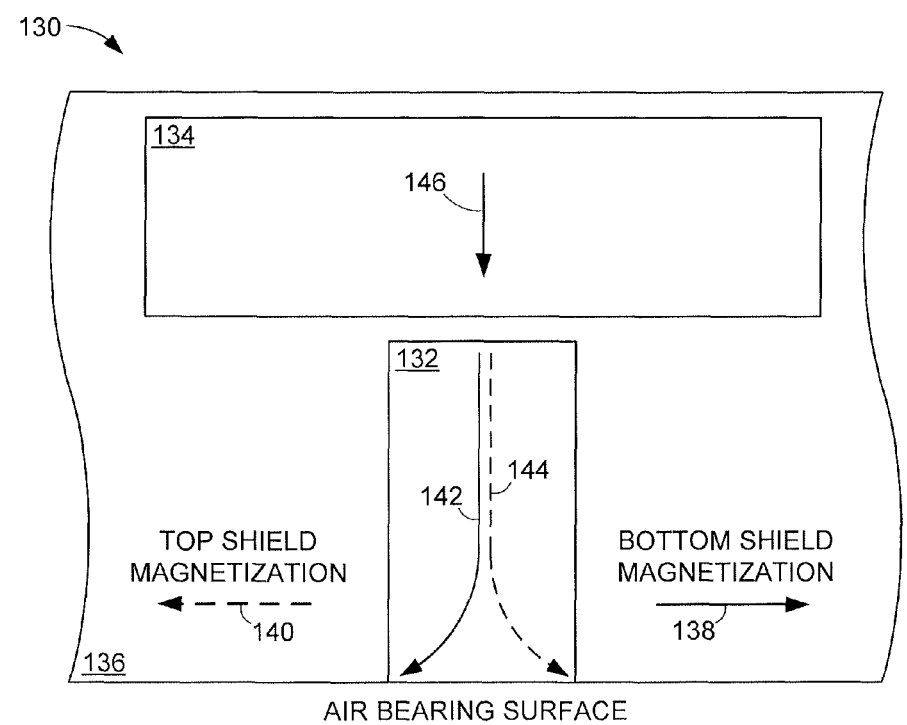
FIG. 2 is a top view of an example portion of a data storage device capable of being used in the data storage environment of FIG. 1.

FIG. 2 provides a top view block representation of a portion of an example data reader 130 as constructed and operated in accordance with some embodiments. The data reader 130 has a trilayer stack 132 positioned on the ABS and separated from a rear bias magnet 134, distal the ABS. The top view of FIG. 2 shows the bottom magnetic shield 136 that is biased to a first magnetization 138 while the not displayed top shield has an opposite magnetization 140 orientation that can be used, in some embodiments, to bias the magnetically free layers of the trilayer stack 132 to opposing default magnetizations 142 and 144.

It should be noted that the trilayer stack 132 of FIG. 2 and through the present disclosure will mean having two ferromagnetic free layers that are not pinned to a fixed magnetization direction by a contacting structure, such as a hard magnet or antiferromagnet (AFM), but instead configured to a magnetization that freely rotates in response to encountered data bits. The bias magnetization 138 and 140 from the shields can operate independently and concurrently with a rear magnetization 146 of the rear bias magnet 134 to orient the trilayer magnetizations 142 and 144 so that encountered magnetic flux at the ABS will result in a predetermined free layer response that is measurable as a data bit.

With data storage advancing to smaller data bits that are more tightly packed onto media, the physical size of the trilayer stack 132 is reduced to maximize data resolution. Such reduction in trilayer stack 132 size, especially free layer thickness as measured along the Y axis, can lower demagnetization energy at the ABS and produce large positive asymmetry that can be susceptible to magnetic noise. As a result, the difference in orientation of the trilayer magnetizations 142 and 144 in response to data bits can be minimized and differentiating data logical values can be unreliable.

Figures 3A, 3B:
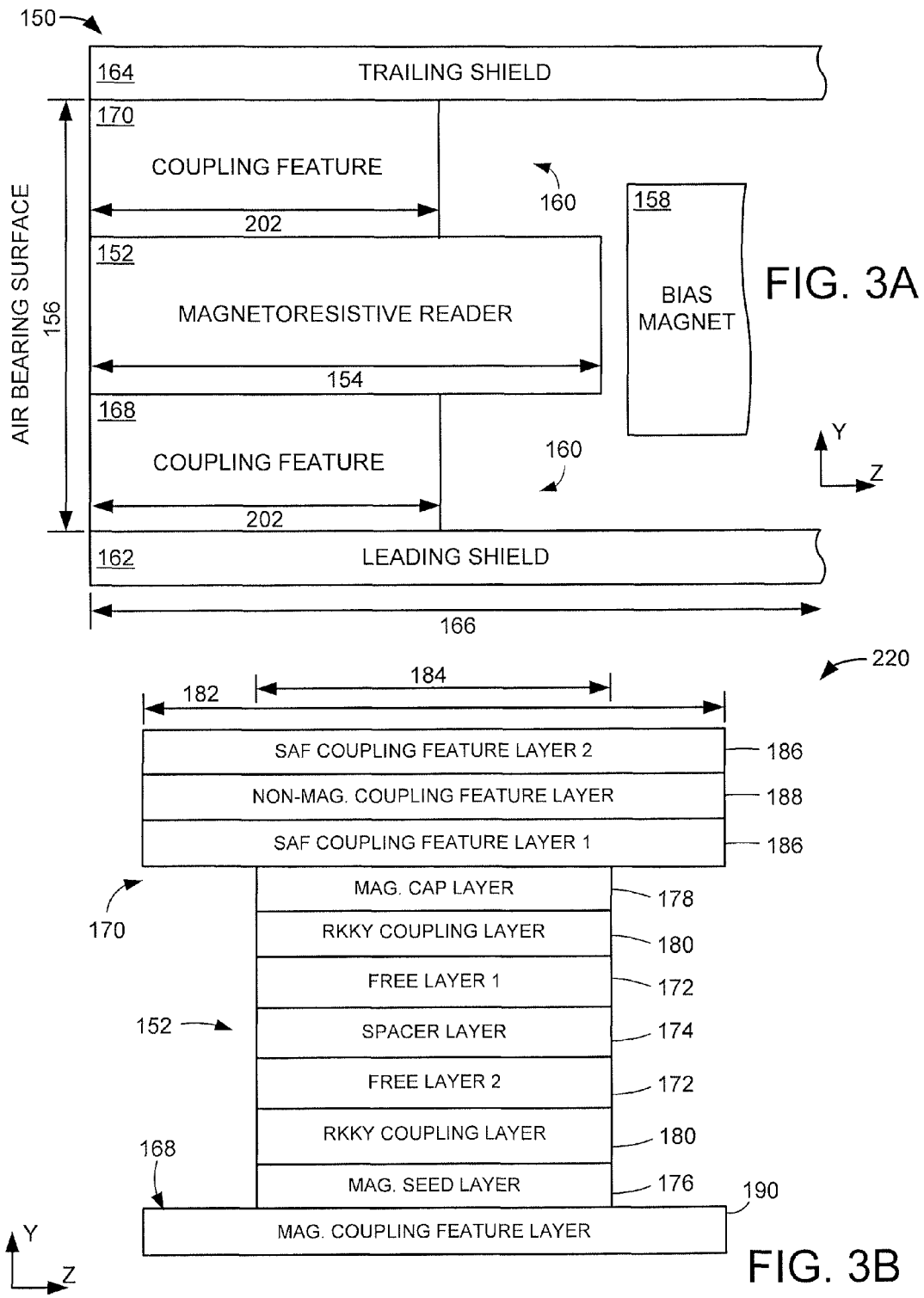
FIGS. 3A and 3B respectively show side and ABS views of an example data reader constructed in accordance with various embodiments.

As illustrated by the cross-sectional block representation of an example data reader 150 in FIG. 3A, a magnetoresistive (MR) reader 152 can be configured with an elongated stripe height 154 extent from the ABS to stabilize reader magnetizations, such as default and encountered data bit magnetizations. Various embodiments configure the reader stripe height 154 to measure four or more times the shield-to-shield distance 156, as measured along the Y axis, to provide consistently repeatable magnetization scissoring between the reader 152 magnetizations.

However, decreasing the shield-to-shield spacing beyond approximately 15 nm can jeopardize the magnetic stability and operation of the reader 152 as reliably biasing reduced thickness layers can be challenging even with a bias magnet 158 having a greater thickness than the reader 152. That is, the elongated stripe height 154 and reduced thickness of the reader 152 can correspond to stable magnetizations proximal the bias magnet 158, but high magnetic volatility at the ABS despite extending the bias magnet 158 into bevel regions 160 on opposite sides of the reader 152. As shown, the tuned configuration of the bevel regions 160 can allow for the bias magnet 158 to have a greater thickness than the reader 152 without promoting shunting of magnetization from the bias magnet 158 to the leading 162 and trailing 164 shields.

While the shields 162 and 164 may be configured with varying thicknesses along their stripe heights 166, the installation of coupling features 168 and 170 can create the bevel regions 160 while coupling shield 162 and 164 magnetizations to the reader 152. Configuring the coupling features 168 and 170 to produce consistent magnetization strengths and orientations to the reader 152 from the shields 162 and 164 can provide reader 152 biasing proximal the ABS, which can complement the bias magnet 158 magnetization to set the reader 152 to default magnetizations that reliably rotate in response to encountered data bits.

The coupling features 168 and 170 may be constructed in similar or dissimilar configurations to couple the shields 162 and 164 to the reader 152, but each feature 168 and 170 has a smaller stripe height 172 extent from the ABS than the reader 152 to shape the bevel regions 160 and constrict data sensing current to portions of the reader proximal the ABS. As such, the coupling features 168 and 170 can provide ABS biasing while defining the bevel regions 160 to prevent bias magnet 158 shunting and optimize sensing current path through the reader 152.

FIG. 3B displays an ABS view block representation of the shield-to-shield portion of data reader 150 with an example coupling feature configuration utilized in various embodiments. The MR reader 152 is constructed as a trilayer stack with dual free layers 172 separated by a non-magnetic spacer layer 174. The trilayer stack may be configured, in some embodiments, with magnetic or non-magnetic seed 176 and cap 178 layers constructed with materials and textures that promote free layer 172 grain growth and predetermined anisotropy.

With longer stripe heights 154, setting default magnetizations in the free layer 172 can be volatile from proximal to distal the ABS. Hence, the trilayer stack can have RKKY coupling layers 180 respectively contacting magnetic seed 176 and cap 178 layers to allow magnetization from the leading 162 and trailing 164 shields to influence the free layers 172 into a default magnetization through antiferromagnetic coupling. Such RKKY coupling can be tuned for strength and orientation through material and thickness of the RKKY layers 180 to sharpen down-track and side sensing to provide optimized linear and cross-track resolution with minimized noise due to reduced thermal fluctuations.

The default magnetizations of the free layers 172 may be set to the shown antiparallel relationship that is accommodated by constructing the first coupling feature 168 as a single magnetic layer and the second coupling feature 170 as a synthetic antiferromagnet (SAF) each directly contacting opposite sides of the trilayer stack 152 with widths 182 that are greater than the stack width 184. While the coupling features 168 and 170 of FIG. 3B can be swapped so that the magnetic layer 178 contacts the trailing shield 164 and the SAF contacts the leading shield 162, the ability to tune the material, width 182, and thickness of the features 168 and 170 allows for precise coupling and magnetization control from the shields 162 and 164 to the free layers 172, which can be useful as the shields 162 and 164 actively handle magnetic flux. For instance, the second coupling feature 170 can be tuned so that the first and second magnetic SAF layers 186 are different thicknesses than the non-magnetic coupling layer 188 and different materials than the single magnetic layer 190 of the second coupling feature 168 to consistently bias the free layers 172 to a predetermined magnetic orientation, like antiparallel.

Figure 4:
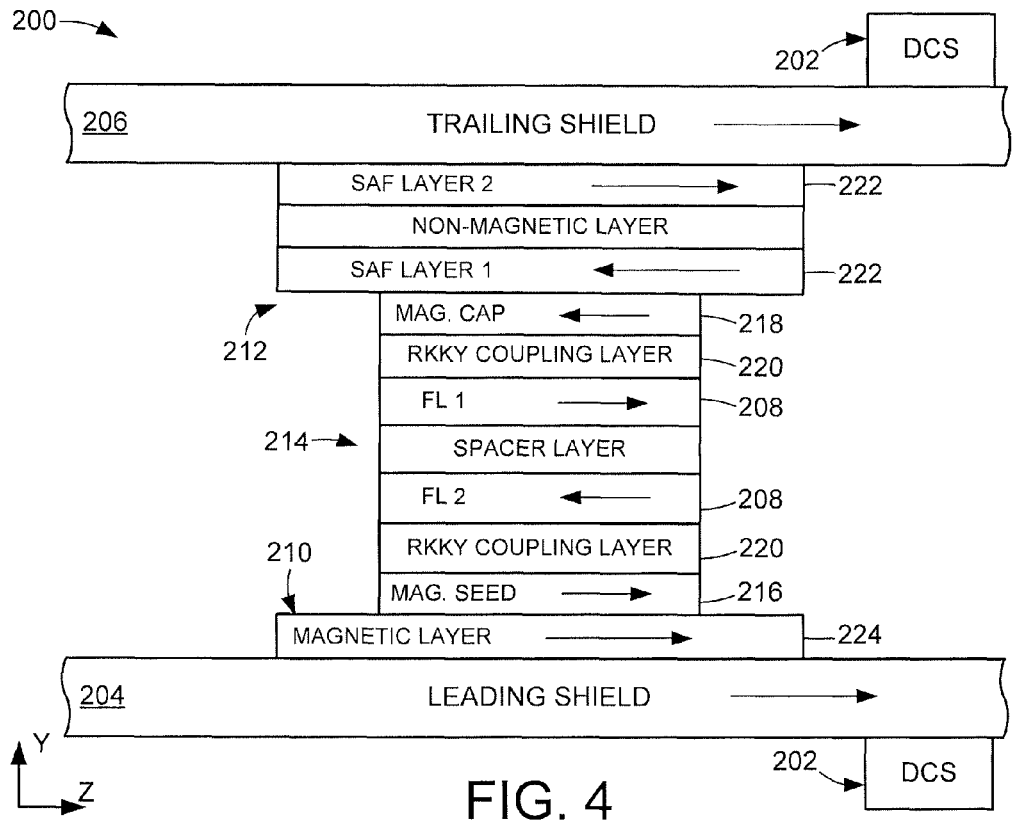
FIG. 4 illustrates a block ABS representation of a portion of an example data reader configured in accordance with some embodiments.

In some operating environments, the magnetic shields 162 and 164 can experience high volume and intensity magnetic flux that, despite the elongated extent 166 from the ABS, may disrupt the default magnetization orientation of the free layers 172. FIG. 4 shows an ABS view block representation of an example data transducing element 200 configured with domain control stabilization (DCS) elements 202 respectively contacting the leading 204 and trailing 206 shields to provide stable, reproducible magnetization orientations that are translated to antiparallel free layer 208 magnetizations by the respective coupling features 210 and 212.

While the DCS elements 202 can be any size, material, and position contacting the shields 204 and 206, some embodiments place each DSC element 202 opposite the coupling features 210 and 212 and laterally offset from the reader lamination 214 along the Z axis. Depending on the presence of side shields and the strength of the DCS elements 202, one or more DCS element 202 can be positioned laterally adjacent the coupling features 210 and 212 on a common side of the shields 204 and 206, which can bias and stabilize the coupling features 210 and 212 concurrently with the shields 204 and 206. With the position of the DCS element 202 on a common lateral side and on exterior shield surfaces of the transducing element 200, the magnetization of the shields 204 and 206 are stable in a common direction, as shown by solid arrows, and corresponds to an antiparallel free layer 208 magnetization orientation via dissimilar coupling feature 210 and 212 configurations.

The construction of the DCS elements 202 and coupling features 210 and 212 complement each other and can be tuned to provide bias magnetization strength that is strong enough to produce free layer 208 default magnetizations, but not too strong to prevent the free layers 208 from responding to encountered data bits in predictable ways. Such balance can be achieved in a variety of non-limiting manners, such as with the tuned construction of the magnetic seed 216, magnetic cap 218, coupling layers 220, SAF layers 222, and single coupling feature layer 224. For example, the width of the SAF 222 and single coupling feature layer 224 can be different, but still greater at the ABS than the reader lamination 214, depending on the presence and strength of the DCS elements 202.

Figure 5:
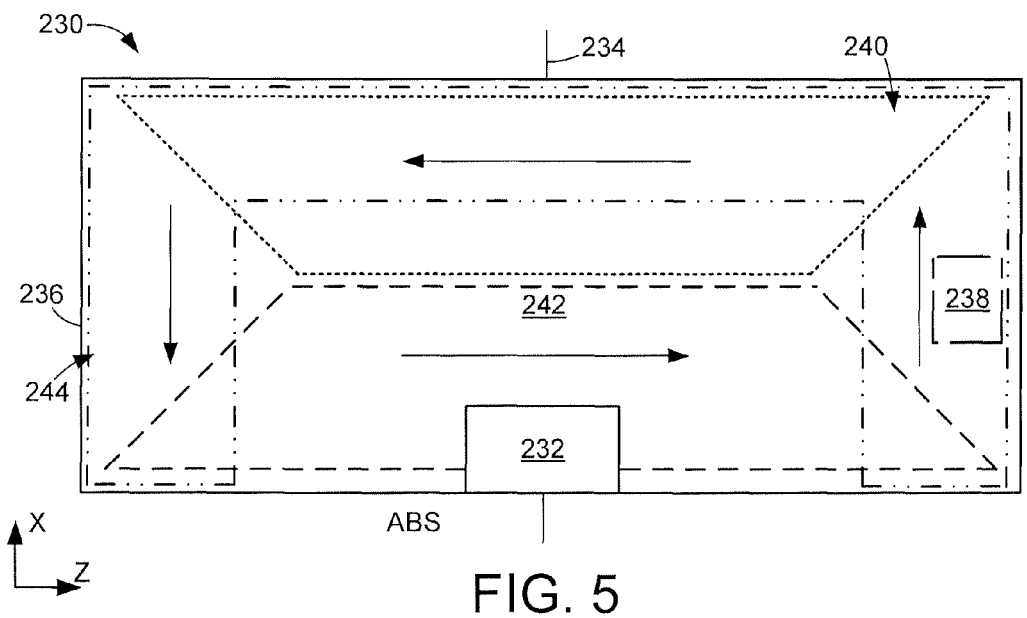
FIG. 5 displays a top view block representation of a magnetic shield capable of being used in a data reader in various embodiments.

FIG. 5 illustrates a top view block representation of a portion of an example data reader 230 constructed with a variety of different DSC elements in accordance with various embodiments. The data reader 230 is shown with a magnetic stack 232 positioned on the ABS and about a centerline 234 of the shield 236. The position of a first DSC element 238 similar to the DCS elements 202 of FIG. 4 can induce a predetermined magnetic loop with predetermined stable magnetic domains, as displayed by solid arrows. With the selected size, shape, material, and position of the first DCS element 238, the number, orientation, and strength of the various magnetic domains can be tuned to provide a variety of different shielding and biasing configurations catered to the type, size, and operation of the magnetic stack 232.

In a non-limiting example, a DCS element similarly sized to element 238 with an areal extent of less than the magnetic stack 232 can be positioned on opposite lateral sides of separate magnetic shields, offset from the ABS and centerline 234, to provide opposite shield magnetic orientations, in contrast to the common magnetic orientation of shields 204 and 206 of FIG. 4. The large size of the magnetic shield 236 in relation to the magnetic stack 232 can correspond with increased magnetic flux saturation during operation, which may inadvertently alter the magnetic domains and bias on the magnetic stack 232. Such conditions may be controlled with an increased physical size stabilization element, such as the second 240 and third 242 DCS elements that are respectively tuned with a trapezoidal shape to substantially cover a magnetic domain portion of the shield 236.

With the second DCS element 240 configuration, the trapezoidal element material can be nested in a beveled portion of the shield 236, distal the ABS, so as not to add to the external dimensions of the data reader 230. While not shown, similar trapezoidal shaped stabilization elements may be positioned on lateral sides of the shield 236 to provide more magnetization than the first DCS element 238, but less than the second DCS element 240.

In some embodiments, a stabilization element, like the third DCS element 242, influences a coupling feature of the magnetic stack 232 and not the shield 236. Such coupling feature DCS element 242 may be independent or in conjunction with the magnetic shield 236 being stabilized by a DCS element. Likewise, multiple coupling features may have individual DCS elements that induce similar or dissimilar magnetic orientations in the coupling features and respective free layer portions of the magnetic stack 232. A stabilization element may also be configured with a non-trapezoidal shape, such as a triangular shape or the rectangular U-shape shown by the fourth DCS element 244, to provide the predetermined magnetic domains without disturbing the magnetization of any coupling feature DCS elements 242.

The shapes, positions, and stabilizing configurations of the first 238, second 240, third 242, and fourth 244 DCS elements illustrates the diversity and ability to tune the magnetization of the shield 236 and coupling feature of the magnetic stack 232. FIG. 6 displays an ABS view block representation of an example data reader 250 configured with a DCS layer 252 and 254 implemented into each coupling feature 256 and 258 in accordance with various embodiments. The construction of the DCS layer 252 and 254 as antiferromagnetic layers respectively contacting the SAF layer 260 of the first coupling feature 256 and the first magnetic cap 262 of the second coupling feature 258 can provide ample magnetization to stabilize the coupling strength of the coupling features 258 and the bias imparted on the first 264 and second 266 free layers of the trilayer magnetic stack 268.

Each DCS layer 252 and 254 may be tuned with respect to the magnetic orientations and strengths of the respective coupling features 256 and 258 to bias the free layers 264 and 266 without detrimentally affecting magnetic rotation in the presence of external data bits. For example, the first DCS layer 252 may have a reduced thickness along the Y axis and different material construction compared to the second DCS layer 254 to accommodate the magnetic strength of the leading shield, first SAF layer 260, and second SAF layer 268 compared to the second magnetic cap 270.

The ability to add magnetization to the coupling features 256 and 258 to complement any bias magnetization from leading and trailing shields may provide too much magnetization and biasing strength for reliable free layer 264 and 266 scissoring operation. FIG. 7 illustrates an ABS view block representation of an example magnetic element 280 configured with first 282 and second 284 coupling features respectively decoupled from leading 286 and trailing 288 shields in accordance with some embodiments to precisely tune the bias magnetization reaching the trilayer magnetic stack 290.

The insertion of first 292 and second 294 non-magnetic spacer layers between the first 282 and second 284 coupling features and the respective shields 286 and 288 can effectively decouple the shield magnetizations in the vicinity of the magnetic stack 290. Such decoupling can allow the first 296 and second 298 SAF layers of the second coupling feature 284 to primarily control the magnetization orientation and strength of the magnetic cap 300, which in turn biases the first free layer 302 to a predetermined default magnetization. Similarly, the first non-magnetic spacer layer 292 reduces or eliminates the magnetization of the leading shield 286 from controlling the magnetization of the first 304 and second 306 magnetic seeds or too strongly biasing the second free layer 308.

With the tuning of the material and thickness of the first and second non-magnetic spacer layers 292 and 294, the magnetization of the leading 286 and trailing 288 shields can be mitigated to allow precise free layer 302 and 308 biasing from the first 282 and second 284 coupling features, which can provide larger magnetic rotation for the free layers 302 and 308 along with higher linear data bit resolution. The decoupling of the shields 286 and 288 can further provide more stable biasing magnetization from the coupling features 282 and 284 when the shields are not configured with DCS elements. Various embodiments decouple only one of the coupling features 282 and 284, such as the SAF of the second coupling feature 284, while coupling the first coupling feature 282 to a shield to provide differing bias magnetization strengths on the magnetic stack free layers 302 and 308, which can optimize magnetic element 280 performance in some environments.

Figure 8:
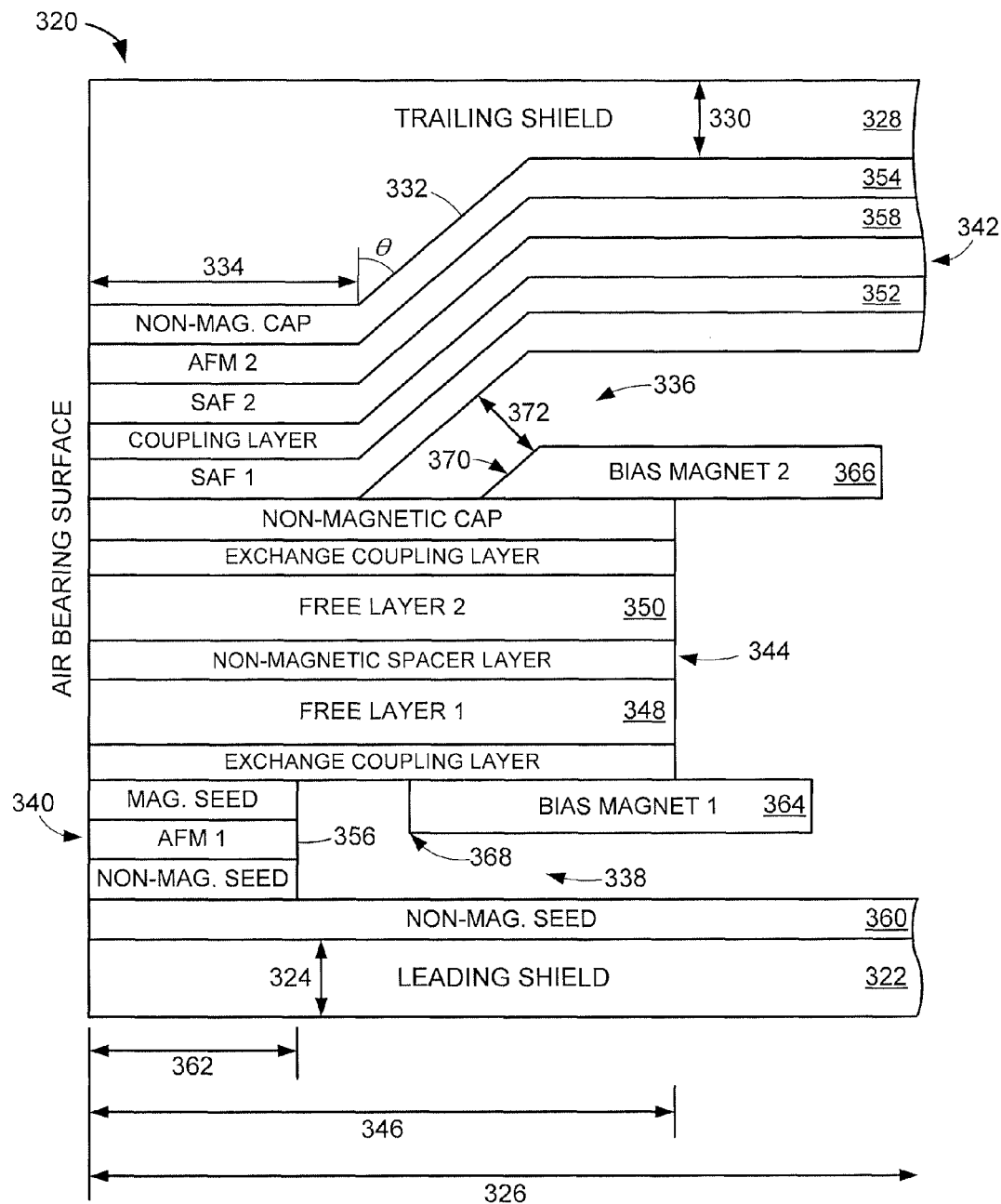
FIG. 8 shows a cross-sectional block representation of an example data reader configured in accordance with some embodiments.

FIG. 8 provides a cross-sectional block representation of an example data reader 320 constructed in accordance with various embodiments. The data reader 320 has the leading shield 322 configured with a uniform thickness 324 along its stripe height 326 from the ABS and the trailing shield 328 having a variable thickness 330 along the stripe height 326. The tuning of the variable thickness 330 so that an increased thickness at the ABS transitions to a reduced thickness via a transition surface 332 that is beveled at a predetermined angle ☐ beginning at a contact distance 334 from the ABS.

The use of variable thicknesses 330 to form the bevel region 336 contrasts the bevel region 338 formed by the insertion of the rectangular first coupling feature 340. The tuning of the angle ☐ of the transition surface 332, such as between 30° and 60° from the Z axis, and the distance 324 from the ABS can position the second coupling feature 342 into contact with less than the entirety of the trilayer magnetic stack 344. That is, the second coupling feature 342 has constituent layers that continuously extend from the shield stripe height 326, but contact the trilayer magnetic stack 344 for a length that is less than the magnetic stack stripe height 346. Such reduced contact area can provide current constriction towards the ABS portion of the magnetic stack 344 where magnetic rotation of the free layers 348 and 350 can be the greatest and most reliable.

The tuned configuration of the variable thickness trailing shield 328 can, in some embodiments, have uniform thickness layers throughout the stripe height 326. In other words, each layer of the second coupling feature 340 can have a similar or dissimilar thickness that continuously extends along the contact distance 334 and transition surface 332 to the rear portion of the trailing shield 328. The uniform thickness along each layer's length can ensure proper coupling strength and orientation that may be sensitive to thickness variations, such as RKKY coupling across non-magnetic coupling 352 and cap 354 layers.

It should be noted data reader 320 implements several different embodiments that are not limited or required. For instance, each coupling feature 340 and 342 has a DCS layer 356 and 358 that have been previously discussed as providing diverse tuning capabilities for biasing the free layers 348 and 350. Each coupling feature 340 and 342 is further equipped with non-magnetic layer 360 and 354 that decouple the shields 322 and 328 from the free layers 348 and 350, as previously addressed with regard to FIG. 7. While not required, the optional DCS and decoupling layers allow the coupling features 340 and 342 to be independently tuned to a variety of different configurations that can correspond to differing bias magnetization being applied to the free layers 348 and 350, which can provide optimized performance in some high areal density data storage environments.

The tuning capabilities of the coupling features 340 and 342 are further illustrated by having the first coupling feature 340 contact the magnetic stack 344 with a stripe height 362 that is less than the contacting distance 334 of the second coupling feature 342, the stripe height 346 of the magnetic stack 344, and the stripe height 326 of the shields 326 and 328, which can concurrently constrict current and focus similar or dissimilar magnetic bias to the respective first 348 and second 350 free layers from the coupling features 340 and 342.

Diverse tuning options are not limited to the coupling features 340 and 342 as the production of rear bias magnetization to the free layers 348 and 350, distal the ABS, can also be configured in a variety of different configurations to optimize magnetic stack 344 performance. In contrast to the use of a single rear bias magnet, such as magnet 158 of FIG. 3A that continuously extends into bevel regions between the magnetic stack and shields, separate first 364 and second 366 bias magnets can occupy portions of the bevel regions 336 and 338 to contact rear portions of the magnetic stack's stripe height 346.

Each bias magnet 364 and 366 can be independently tuned for size, shape, and material to impart various bias magnetizations onto the magnetic stack 344. For example, the first bias magnet 364 can be tuned as a lamination of magnetic metallic and non-magnetic insulating layer with a square leading edge 368 while the second bias magnet 366 is a single magnetic layer with a tapered leading edge 370 that matches the angle □ of the transition surface 332 to provide a uniform insulating distance 372 between the second coupling feature 342 and the second bias magnet 366. To complement such tuning sizes and shapes for the bias magnets 364 and 366, the material may also be tuned for magnetic strength, uniaxial anisotropy, and coupling type to provide predetermined bias magnetization to the rear portion of the free layers 348 and 350, distal the ABS.

With the plethora of trilayer magnetic stack biasing configurations with coupling features and rear bias magnets, magnetic response to encountered data bits can experience less magnetic noise to produce increased down-track and cross-track data bit resolution. The concurrent use of separate rear bias magnet and coupling feature elements allows for tuned biasing of ABS and rear portions of the magnetic stack to provide near zero asymmetry and optimized biasing profiles. Moreover, the combination of beveled regions with coupling features contacting the magnetic stack for less than the stack's entire stripe height from the ABS allows the data reader to be scaled to less than 15 nm shield-to-shield spacing with stabilized default and operational magnetizations in the free layers of the magnetic stack.

While the embodiments have been directed to magnetic sensing, it will be appreciated that the claimed invention can readily be utilized in any number of other applications, including data storage device applications. It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present technology.

What is claimed is:

1. An apparatus comprising a trilayer reader contacting and biased by a coupling feature, the coupling feature disposed between a magnetic shield and the trilayer reader, the coupling feature comprising a synthetic antiferromagnet, having a smaller extent from an air bearing surface (ABS) than the trilayer reader, and having a larger width on the ABS than the trilayer reader.

2. The apparatus of claim 1, wherein the coupling feature couples the trilayer reader to a magnetic shield.

3. The apparatus of claim 2, wherein the coupling feature comprises a lamination of directly contacting magnetic layers.

4. The apparatus of claim 1, wherein the coupling feature comprises a lamination of magnetic and non-magnetic layers.

5. The apparatus of claim 1, wherein the trilayer reader comprises first and second ferromagnetic free layers contacting opposite sides of a non-magnetic spacer layer.

6. The apparatus of claim 5, wherein first and second exchange coupling layers respectively contact the first and second ferromagnetic free layers opposite the non-magnetic spacer layer.

7. The apparatus of claim 6, wherein the first and second exchange coupling layers respectively RKKY couple the first and second ferromagnetic free layers separate magnetic shields.

8. A transducing head comprising a coupling feature disposed between and coupling a trilayer reader to a magnetic shield, the coupling feature comprising a synthetic antiferromagnet, having a smaller perpendicular extent from an air bearing surface (ABS), and having a larger width on the ABS than the trilayer reader to define a non-magnetic bevel region between the trilayer reader and magnetic shield, distal the ABS.

9. The transducing head of claim 8, wherein the extent of the trilayer reader from the ABS in a first direction is greater than four times the extent of the trilayer reader along the ABS in a second direction, orthogonal to the first direction.

10. The transducing head of claim 9, wherein a biasing magnet is adjacent to and separated from the trilayer reader, distal the ABS, the biasing magnet having a greater extent along the ABS in the second direction than the trilayer reader.

11. The transducing head of claim 10, wherein the biasing magnet extends into the non-magnetic bevel region.

12. The transducing head of claim 8, wherein the magnetic shield has a greater perpendicular extent from the ABS than the trilayer reader and coupling feature.

13. A data storage device comprising a trilayer reader respectively coupled to and biased by first and second magnetic shields via first and second coupling features, the first coupling feature comprising a synthetic antiferromagnet, the first and second coupling features each contacting the trilayer reader with smaller extents from an air bearing surface (ABS) and larger widths on the ABS than the trilayer reader.

14. The data storage device of claim 13, wherein the first and second magnetic shields are set to a common magnetic orientation.

15. The data storage device of claim 14, wherein the first magnetic shield contacts a first domain control element distal the ABS and trilayer reader.

16. The data storage device of claim 15, wherein the second magnetic shield contacts a second domain control element on the ABS.

17. The data storage device of claim 16, wherein the second domain control element continuously surrounds the trilayer reader along two orthogonal sides.

18. The data storage device of claim 13, wherein at least one magnetic shield has a varying thickness defined by an angled transition region distal the ABS and within the trilayer reader extent from the ABS.

19. The data storage device of claim 18, wherein at least one coupling feature continuously extends along the angled transition region.

* * * * *